United States Patent [19]

Marnet et al.

[11] Patent Number: 4,486,388
[45] Date of Patent: Dec. 4, 1984

[54] APPARATUS FOR NEUTRALIZING ACIDIC OR ACID-CONTAINING POLLUTANTS IN FURNACE FLUE GASES

[75] Inventors: Chrysanth Marnet; Borchert Kassebohm, both of Düsseldorf, Fed. Rep. of Germany

[73] Assignee: Stadtwerke Düsseldorf AG

[21] Appl. No.: 433,288

[22] Filed: Oct. 7, 1982

[30] Foreign Application Priority Data

Oct. 13, 1981 [DE] Fed. Rep. of Germany ....... 3140515

[51] Int. Cl.³ .......................... F01N 3/15; B01D 47/06
[52] U.S. Cl. ................... 422/178; 422/171; 55/300; 55/435; 261/161
[58] Field of Search ................ 55/112, 241, 300, 435; 261/81, 116, 159, 160, 161, DIG. 48; 422/178, 204, 210, 212, 171

[56] References Cited

U.S. PATENT DOCUMENTS 1,810,922  6/1931  Mills ..................................... 55/300
1,994,078  3/1935  Sieloff ................................. 261/116
3,577,709  5/1971  Hoad .................................... 55/435

FOREIGN PATENT DOCUMENTS 15698  6/1884  Italy ..................................... 261/116

*Primary Examiner*—David L. Lacey
*Attorney, Agent, or Firm*—Toren, McGeady and Stanger

[57] ABSTRACT

An apparatus for neutralizing acidic or acid-containing pollutants in furnace flue gases comprising a flue gas duct having an inner pipe suspended therein and arranged so that the flue gases can flow both inside and outside the pipe. Preferably, the gases flow upwards around the outside of the pipe to an outlet zone. Atomizers project into the inner pipe for spraying an extremely fine suspension of a neutralizing agent in water into the flue gases flowing through the pipe. The inner pipe is formed from a plurality of longitudinal strips which are separate from each other and are suspended from their upper ends. Vibrating apparatus is provided for periodically vibrating the strips to dislodge deposits of neutralizing agent and fly ash on the inside of the pipe, thereby preventing the build-up of a permanent coating.

15 Claims, 4 Drawing Figures

APPARATUS FOR NEUTRALIZING ACIDIC OR ACID-CONTAINING POLLUTANTS IN FURNACE FLUE GASES

BACKGROUND OF THE INVENTION

1. Field of the Invention

This invention relates to an apparatus for neutralizing acidic or acid-containing pollutants in furnace flue gases, comprising a contact zone in a portion of a duct for carrying the flue gases from the furnace. The duct has atomizers projecting into the contact zone for introducing a neutralizing agent in extremely finely divided form into the flue gases. Usually, the agent is introduced as a suspension of a basically reacting solid substance, such as, lime in water.

2. Description of the Prior Art

Apparatus of this kind is described in German Offenlegungsschrift No. 28 47 591, the contact zone being formed by a simple vertically oriented portion of the flue gas duct. It has been found that due to the drying of the neutralizing agent, a wall coating consisting of a mixture of neutralizing agent and fly ash results. In the past, the removal of such coatings has presented difficulties.

SUMMARY OF THE INVENTION

The aim of the present invention is to construct an apparatus of the kind described so that wall deposits resulting from the neutralization process in the contact zone can be eliminated or removed in a simple manner.

This is accomplished with the present invention which comprises an apparatus of the type described above having atomizers which project into an inner pipe which is suspended in the contact zone so that flue gas is able to flow both inside and outside the pipe. The pipe is formed by a plurality of longitudinal strips which are separate from each other and have means connected thereto for vibrating the strips. Since the contact of the atomizing spray occurs only in the inner pipe, deposits from the neutralizing process precipitate only on the inside wall of the inner pipe. The coating which thus forms dries rapidly since the inner pipe is heated by the flue gases which flow outside the pipe. However, because the inner pipe is formed from longitudinal strips which can be vibrated, the dried coating can be removed at regular intervals. The vibrators and the longitudinal strips are adapted or tuned to one another so that the strips when the vibrating means is operated, are set in correspondingly effective vibrations. In this manner, an automated removal of the deposits which form during the neutralization process is possible.

DESCRIPTION OF THE PREFERRED EMBODIMENTS

Figure 1A:
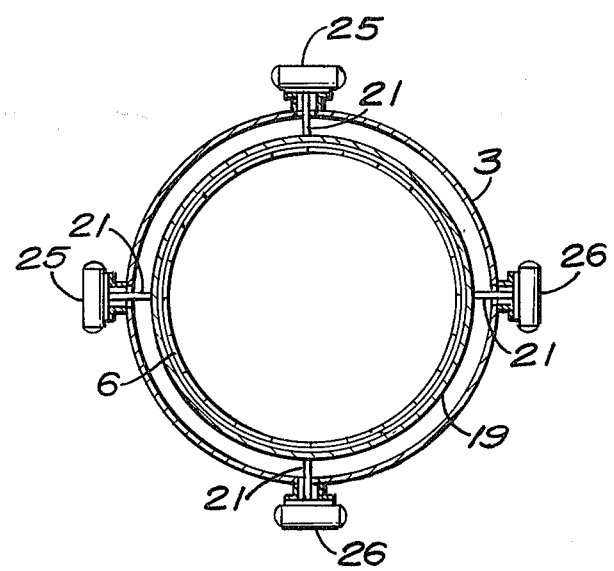
FIG. 1a is a horizontal cross-sectional view of the apparatus of FIG. 1.

Preferably, the atomizers are disposed in the region of one end of the inner pipe which forms an inlet for the flue gases into the pipe, in order that the entire length of the inner pipe can be utilized.

The longitudinal strips are preferably assembled to form an inner pipe having a regular polygonal cross-section, so that flat steel strips can be used to form the pipe. The strips may be suspended at least at one end from a circular ring.

The means for vibrating the longitudinal strips preferably comprises at least one external circumferential tire or hoop connected to the strips, and at least one vibrator connected to the tire or hoop. With this arrangement all longitudinal strips can be simultaneously set in vibration. The circumferential tire(s) or hoop(s) preferably lie loosely upon hooks situated on the longitudinal strips. Ideally, there should be one circumferential tire or hoop positioned near the center of the longitudinal strips and another positioned in the last third of the longitudinal strips. Preferably, four vibrators act at equal angular intervals upon each circumferential tire or hoop. The vibrators used may be of the known type for electrically vibrating containers.

The inner pipe may be subdivided in the longitudinal direction into at least two inner pipe portions suspended independently of one another end to end. In this manner, a specific inner pipe length can be adjusted to the desired vibration performance, depending on the particular requirements of the situation.

The apparatus may be arranged so that in use, the flue gases flow through the inner pipe and through the annular space between the inner pipe and the surrounding portion of the flue gas duct in parallel flow, the cross-section of the annular duct being formed just sufficiently large for the heating of the inner pipe. The annular space should therefore be made as small as possible, since the flue gas stream flowing through is not subjected to any neutralization. It should therefore be only just sufficiently large for the inner pipe to be adequately heated.

It is preferred, however, to arrange the apparatus so that in use, the flue gases flow through the inner pipe and through the annular duct formed between the inner pipe and the surrounding portion of the flue gas duct in counter-flow, the flue gases preferably flowing first through the annular duct before turning through 180° to flow back through the inner pipe. In this manner, the hot flue gas first of all heats up the inner pipe and then passes entirely into the space enclosed by the inner pipe wherein the entire volumetric flow is subjected to the neutralization treatment.

The inner pipe is preferably suspended by springs, which may be constructed as cut springs. Furthermore, the inner pipe and the contact zone are preferably oriented vertically, since in this way, a particularly simple suspension of the inner pipe can be achieved and also the guidance of the flue gas can be effected relatively easily.

A collecting hopper may be disposed beneath the inner pipe to enable deposits shaken off by operation of the vibrators to be collected and removed.

Figure 1:
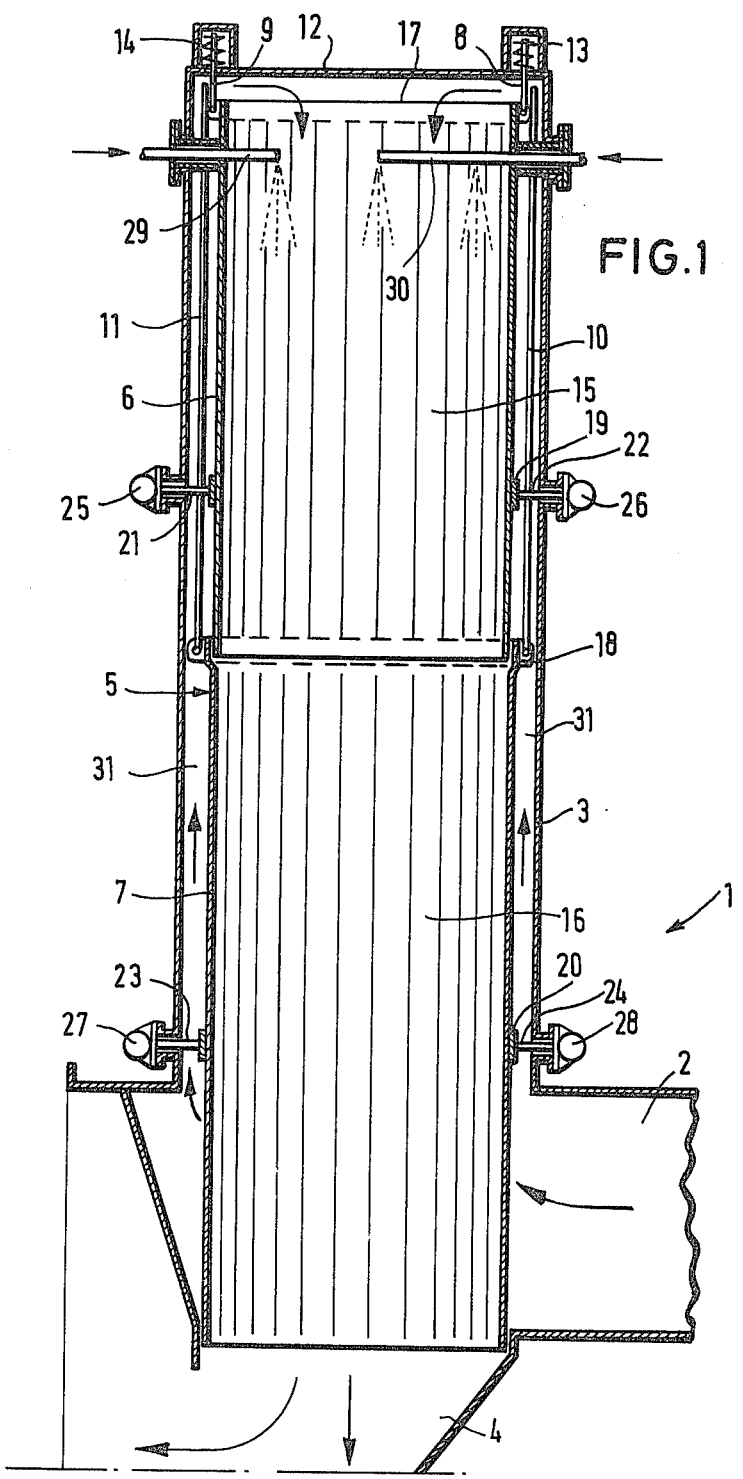
FIG. 1 is a diagrammatic vertical section through the apparatus.

Referring to the drawings, FIG. 1 shows part of a flue gas duct 1 comprising a feed duct 2 coming from a furnace, a vertically oriented portion forming a contact zone 3, and a discharge portion 4.

Suspended in the contact zone 3 is an inner pipe 5 which consists of two inner pipe portions 6, 7 disposed one on top of the other. The upper inner pipe portion 6 is suspended from the closed top end 12 of the flue duct portion 3 by short tension rods 8, 9 and cup springs 13, 14. The lower inner pipe portion 7 is suspended in a similar manner, but independently of the upper portion 6 by externally hanging long tension rods 10, 11.

The two inner pipe portions 6, 7 are composed of longitudinal strips 15, 16 of 3 mm thick steel sheet connected together at their upper ends by circular rings 17, 18. They form virtually a polygon in cross-section, the longitudinal edges of adjacent strips being spaced slightly apart, this being indicated in the drawing by vertical lines.

The inner pipe portions 6, 7 are surrounded by circumferential tires or hoops 19, 20 which, although not illustrated, rest loosely upon hooks mounted on the longitudinal strips 15, 16. Tires or hoops 19, 20 are connected via radially outwardly extending plungers 21, 22, 23, 24 to electrical vibrators 25, 26, 27 28 mounted elastically on the outer casing of the contact zone 3. Although only two are shown, each tire or hoop is connected to four vibrators arranged at equal angular intervals around the casing.

By appropriate selection or tuning of the vibrators 25, 26, 27, 28, the prestress of the plungers 21, 22, 23, 24 and the elastic mounts and also the length of the longitudinal strips 15, 16, the strips can be stimulated into vibration by switching on the vibrators 25, 26, 27, 28. At the upper end of the contact zone 3, atomizer nozzles 29, 30 project into the inner pipe 5 for introducing into the pipe 5 an extremely fine spray of a suspension of a neutralizing agent. The flue gas, which flows from the horizontally oriented feed duct 2 upwardly through the annular space 31 between the outside of the inner pipe 5 and the inside of the contact zone casing, and then back through the inner pipe 5 itself, is thus charged with neutralizing agent in the inner pipe 5. A mixture of neutralizing suspension and fly ash precipitates on the inner faces of the longitudinal strips 15, 16 and is dried by the heat imparted to the longitudinal strips by the flue gas flowing upwards in the annular space 31. By temporarily switching on the vibrators 25, 26, 27, 28, the longitudinal strips 15, 16 are set in vibration in such a manner that the coating falls off and downwards out of the inner pipe. In this manner, an automated removal of the coating is realized. Permanent deposits are thereby avoided.

Figure 2:
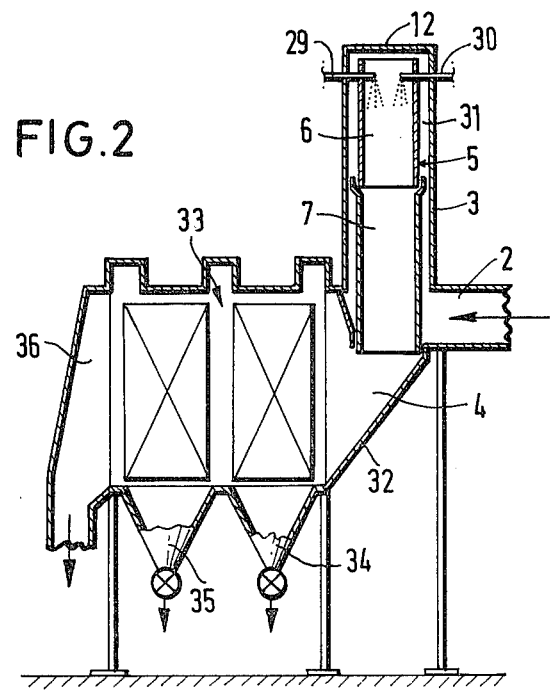
FIG. 2 is a diagrammatic view showing the apparatus of FIG. 1 in conjunction with an electrostatic filter disposed downstream thereof.

FIG. 2 shows the apparatus of FIG. 1 as part of a complete flue duct assembly. The flue gas stream enters the apparatus via the feed duct 2, flows upwards through the annular space 31 as far as the top end 12 of the contact zone 3, and then changes direction to flow back down through the inner pipe 5 consisting of the upper and lower inner pipe portions 6, 7. In pipe 5 a neutralizing suspension is sprayed into the flue gas from the atomizer nozzles 29, 30. The neutralized flue gas flows from the lower end of the inner pipe 5 and is then guided by an inclined plate 32 into an electrical filter 33. This has a conventional construction and will therefore not be described in detail. Underneath the electrical filter 33, there are two collecting hoppers 34, 35 through which the precipitated dust from the electrical filter 33 and the deposits from the inner wall of the inner pipe 5, after they have been shaken off, can be removed. The flue gas finally leaves the electrical filter 33 through an outlet 36.

Figure 3:
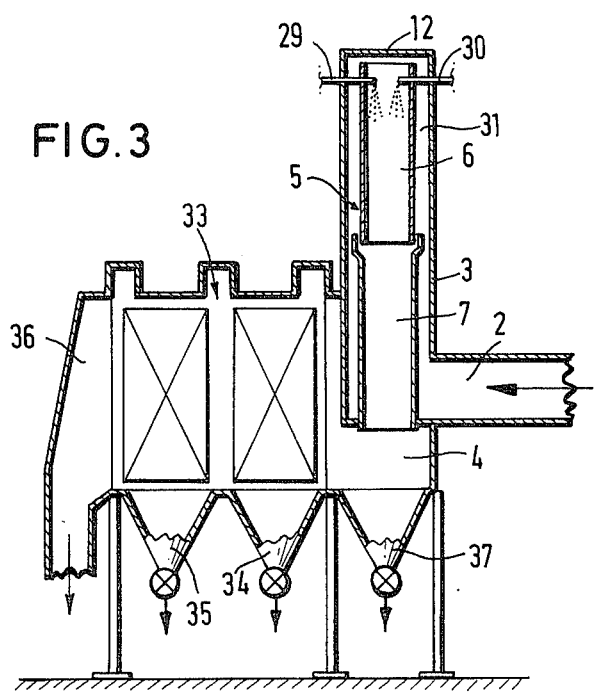
FIG. 3 is a view similar to that of FIG. 2 but showing another form of assembly incorporating the apparatus of FIG. 1.

In FIG. 3, a modified form of the flue duct assembly of FIG. 2 is illustrated, similar components being given the same reference numerals. The sole difference between the two assemblies is that in FIG. 2, an inclined plate 32 is provided in the region 4 between the pipe 5 and filter 33, whereas in FIG. 3, a collecting hopper 37 is provided underneath the inner pipe 5 so that the coating shaken off from the inner pipe 5 can be separately removed. No mixing therefore takes place with the deposits falling down from the capture electrodes of the electrical filter 33.

We claim:

1. In an apparatus for neutralizing acidic or acid-containing pollutants in furnace flue gases, said apparatus having a flue gas duct portion defining a contact zone, and atomizers mounted in said flue gas duct portion and projecting into said contact zone for introducing a neutralizing agent in extremely finely divided form into said flue gases, the improvement which comprises an inner pipe suspended within and coaxially with said flue gas duct portion to form a space between the duct portion and pipe, said apparatus having a gas inlet in flow communication with said space, whereby said flue gases are able to flow both inside and outside of said inner pipe, the inner pipe having an outlet for exit gas therefrom, said atomizers projecting into said inner pipe, said inner pipe being composed of a plurality of longitudinal strips which are separate from each other and having an end spaced from the duct portion to provide gas flow communication through the pipe by gas flow around the spaced end, and means connected to said longitudinal strips for vibrating them.

2. The apparatus of claim 1 wherein said inner pipe has one end thereof defining an inlet for said flue gases into said inner pipe and said atomizers are disposed in the region of said inlet.

3. The apparatus of claim 1 wherein said inner pipe has a regular polygonal cross-section.

4. The apparatus of claim 1 wherein said inner pipe includes a circular ring and said longitudinal strips are suspended from said circular ring.

5. The apparatus of claim 1 wherein at least one external circumferential tire is connected to said strips and wherein said vibrating means is at least one vibrator which is connected to said at least one tire.

6. The apparatus of claim 5 having a first circumferential tire positioned near the center of said longitudinal strips and a second circumferential tire positioned in the last third of said strips.

7. The apparatus of claim 5 wherein said at least one vibrator comprises four vibrators connected to said at least one circumferential tire, said vibrators being located at equal angular intervals around said at least one tire.

8. The apparatus of claim 5 wherein said at least one vibrator is an electrical vibrator.

9. The apparatus of claim 1 wherein said inner pipe is subdivided into at least two inner pipe portions, and said at least two inner pipe portions are suspended independently of one another.

10. The apparatus of claim 1 wherein said inner pipe and said flue duct portion defining said contact zone are positioned and arranged to define therebetween an annular duct such that said flue gases flow through said inner pipe and through said annular duct in parallel flow, the cross-section of said annular duct being just sufficiently large for the heating of said inner pipe by said flue gases flowing through said annular duct.

11. The apparatus of claim 1 wherein said inner pipe and said flue duct portion defining said contact zone are positioned and arranged to define therebetween an annular duct such that said flue gases flow through said inner pipe and through said annular duct in counterflow.

12. The apparatus of claim 1 wherein said inner pipe is suspended by springs.

13. The apparatus of claim 12 wherein said springs are cup springs.

14. The apparatus of claim 13 which further comprises a collecting funnel disposed beneath said inner pipe.

15. The apparatus of claim 1 wherein said inner pipe and said flue duct portion defining said contact zone are vertically oriented.

* * * * *